(12) United States Patent
Hirata

(10) Patent No.: US 11,303,479 B2
(45) Date of Patent: Apr. 12, 2022

(54) COMMUNICATION DEVICE FOR VEHICLE AND SKEW CORRECTING METHOD

(71) Applicant: TOYOTA JIDOSHA KABUSHIKI KAISHA, Toyota (JP)

(72) Inventor: Yoshiroh Hirata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/335,370

(22) Filed: Jun. 1, 2021

(65) Prior Publication Data

US 2022/0021563 A1 Jan. 20, 2022

(30) Foreign Application Priority Data

Jul. 16, 2020 (JP) .............................. JP2020-122260

(51) Int. Cl.
*H04L 25/02* (2006.01)
*H04L 25/03* (2006.01)
*H04L 25/14* (2006.01)

(52) U.S. Cl.
CPC .... *H04L 25/0272* (2013.01); *H04L 25/03885* (2013.01); *H04L 25/14* (2013.01)

(58) Field of Classification Search
CPC ........... H04L 25/0272; H04L 25/03885; H04L 25/14
See application file for complete search history.

(56) References Cited

U.S. PATENT DOCUMENTS

| | | | | |
|---|---|---|---|---|
| 10,491,219 | B2 * | 11/2019 | Seo ................. | H03K 19/00323 |
| 2004/0223566 | A1 * | 11/2004 | Yamashita ........... | H04L 7/0091 |
| | | | | 375/354 |
| 2006/0256880 | A1 * | 11/2006 | Frisch .................. | H04L 25/085 |
| | | | | 375/257 |
| 2009/0121761 | A1 * | 5/2009 | Fung ................. | H04L 25/03878 |
| | | | | 327/161 |
| 2010/0295591 | A1 * | 11/2010 | Asmanis .......... | H04L 25/03878 |
| | | | | 327/276 |
| 2011/0075761 | A1 * | 3/2011 | Kuwata .................. | H04L 25/14 |
| | | | | 375/296 |
| 2012/0087420 | A1 * | 4/2012 | Kim ...................... | H03K 5/135 |
| | | | | 375/259 |
| 2013/0014199 | A1 * | 1/2013 | Horan .................... | H04N 5/775 |
| | | | | 725/127 |
| 2013/0229211 | A1 * | 9/2013 | Nishiyama .............. | H03L 7/00 |
| | | | | 327/146 |

FOREIGN PATENT DOCUMENTS

JP 2009-302672 A 12/2009

* cited by examiner

*Primary Examiner* — Freshteh N Aghdam

(74) *Attorney, Agent, or Firm* — Oliff PLC

(57) ABSTRACT

A communication device for a vehicle includes: a transmitting section that transmits differential signals from a first control section to a second control section via a transmission path; a receiving section that receives the differential signals that were transmitted to the second control section by the transmitting section; a skew measuring section that measures a signal difference of the differential signals on the transmission path; and a transmitting/receiving skew correcting section that, based on the signal difference measured by the skew measuring section, corrects both transmitting time differential signals that are transmitted from the first control section and receiving time differential signals that are received at the second control section.

8 Claims, 8 Drawing Sheets

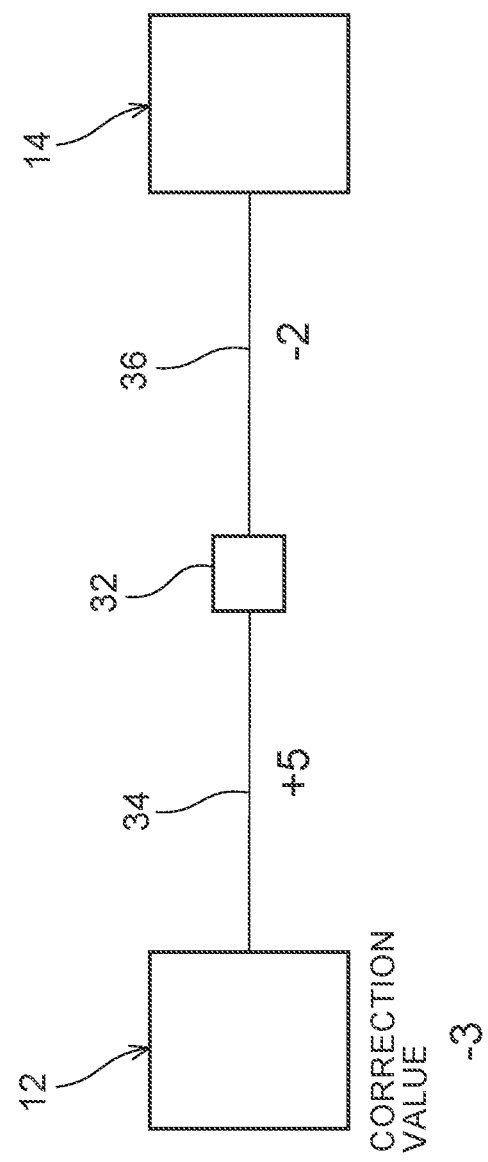

COMMUNICATION DEVICE FOR VEHICLE AND SKEW CORRECTING METHOD

CROSS-REFERENCE TO RELATED APPLICATION

This application is based on and claims priority under 35 USC 119 from Japanese Patent Application No. 2020-122260 filed on Jul. 16, 2020, the disclosure of which is incorporated by reference herein.

BACKGROUND

Technical Field

The present disclosure relates to a communication device for a vehicle and a skew correcting method.

Related Art

Japanese Patent Application Laid-Open (JP-A) No. 2009-302672 discloses a system that automatically corrects data skew that includes a skew correcting circuit that, in a case in which a characteristic value of a device does not satisfy a reference value, adjusts the output timing of data outputted from a transmitting circuit (a transmitting section) in accordance with a clock signal. Concretely, a receiving circuit (receiving section) receives data at the correct timing due to data, which has been corrected by the skew correcting circuit, being outputted to the receiving circuit.

At a time when communication is carried out by respective vehicle equipment, the ensuring of EMC (Electromagnetic Compatibility) is required in order to not generate noise at the periphery. There are known communication devices that carry out transmitting and receiving of data by using differential signals as an EMC countermeasure. However, in the system that automatically corrects data skew that is disclosed in JP-A No. 2009-302672, differential skew (i.e., the signal difference between single-ended signals), which arises at a noise invading section such as relay connector or the like that is disposed between the transmitting section and the receiving section, cannot be suppressed, and there is room for improvement.

SUMMARY

The present disclosure provides a communication device for a vehicle and a skew correcting method that may suppress differential skew that arises at a noise invading section that is between a transmitting section and a receiving section.

A first aspect of the present disclosure is a communication device for a vehicle including: a transmitting section that transmits differential signals from a first control section to a second control section via a transmission path; a receiving section that receives the differential signals that were transmitted to the second control section by the transmitting section; a skew measuring section that measures a signal difference of the differential signals on the transmission path; and a transmitting/receiving skew correcting section that, based on the signal difference measured by the skew measuring section, corrects both transmitting time differential signals that are transmitted from the first control section and receiving time differential signals that are received at the second control section.

In the communication device for a vehicle of the first aspect, transmitting section transmits differential signals from a first control section to a second control section via a transmission path. The receiving section receives the differential signals that were transmitted to the second control section by the transmitting section. The skew measuring section measures the signal difference of the differential signals on the transmission path. Here, the □signal difference□ that the skew measuring section measures is not limited to the signal difference of the entire transmission path from the first control section to the second control section, and includes the signal difference from the first control section to a predetermined position on the transmission path, and the signal difference from the second control section to a predetermined position on the transmission path.

On the basis of the signal difference measured at the skew measuring section, the transmitting/receiving skew correcting section corrects both the transmitting time differential signals that are transmitted from the first control section and the receiving time differential signals that are received at the second control section. By correcting the differential signals at both the first control section and the second control section in this way, even in a case in which a noise invading section, such as a relay connector or the like, exists between the first control section and the second control section, the signal difference at this noise invading section can be eliminated or can be made to near zero.

Moreover, by eliminating the signal difference from the first control section to the noise invading section and the signal difference from the second control section to the noise invading section, the signal difference of the entire transmission path from the first control section to the second control section also can be eliminated or can be made to near zero, and the occurrence of receiving errors can be suppressed.

A second aspect of the present disclosure, in the first aspect, may further include: a correction start timing notification section, wherein the correction start timing notification section notifies the second control section of a timing of a start of correction of the transmitting time differential signals by the transmitting/receiving skew correcting section, or notifies the first control section of a timing of a start of correction of the receiving time differential signals by the transmitting/receiving skew correcting section.

In the communication device for a vehicle of the second aspect, due to the correction start timing notification section notifying the second control section of the timing of the start of correction of the transmitting time differential signals, the timing of the start of correction of the receiving time differential signals may be made to accord with the timing of the start of correction of the transmitting time differential signals. Similarly, due to the correction start timing notification section notifying the first control section of the timing of the start of correction of the receiving time differential signals, the timing of the start of correction of the transmitting time differential signals may be made to accord with the timing of the start of correction of the receiving time differential signals.

A third aspect of the present disclosure, in the first aspect or the second aspect, may further include: a transmission skew correcting section that corrects only the transmitting time differential signals such that the signal difference disappears on the entire transmission path, wherein the transmitting/receiving skew correcting section corrects the transmitting time differential signals and the receiving time differential signals in a case in which, in a state in which the transmitting time differential signals have been corrected by the transmission skew correcting section, receiving errors by the receiving section occur a predetermined number of times or more.

In the communication device for a vehicle of the third aspect, during the time period until the number of receiving errors reaches a predetermined number, only the transmitting time differential signals that are transmitted from the first control section are corrected. Due thereto, unnecessary correction of both the differential signals at the time of transmitting and the differential signals at the time of receiving in a state in which the receiving of the differential signals is being carried out relatively well, may be suppressed. Further, in a case in which receiving errors have occurred a predetermined number of times or more, both the transmitting time differential signals and the receiving time differential signals are corrected by the transmitting/receiving skew correcting section. Due thereto, receiving errors that are caused by a noise invading section or the like that is on the transmission path may be suppressed.

In a fourth aspect of the present disclosure, in any one of the first through third aspects, the transmitting/receiving skew correcting section corrects the transmitting time differential signals and the receiving time differential signals such that the signal difference between the first control section and a relay connector that is provided on the transmission path, and the signal difference between the second control section and the relay connector, disappear.

In the communication device for a vehicle of the fourth aspect, due to the transmitting/receiving skew correcting section correcting the transmitting time differential signals that are transmitted from the first control section, the signal difference from the first control section to the relay connector may be eliminated. Further, due to the transmitting/receiving skew correcting section correcting the receiving time differential signals that are received at the second control section, the signal difference from the relay connector to the second control section may be eliminated.

In a fifth aspect of the present disclosure, in any one of the first through third aspects, the transmitting/receiving skew correcting section acquires combinations of a correction value of the transmitting time differential signals and a correction value of the receiving time differential signals such that the signal difference measured by the skew measuring section disappears, and carries out correction of the transmitting time differential signals and the receiving time differential signals by using all of the combinations, and sets the correction value of the transmitting time differential signals and the correction value of the receiving time differential signals from among combinations of correction values at which receiving errors by the receiving section do not occur.

In the communication device for a vehicle of the fifth aspect, combinations of the correction value of the transmitting time differential signals and the correction value of the receiving time differential signals at which the signal difference of the entire transmission path disappears, are acquired. Then, correction of the transmitting time differential signals and the receiving time differential signals is carried out by using all of the acquired combinations, and a combination of correction values at which a receiving error does not occur is selected. By setting the correction value of the transmitting time differential signals and the correction value of the receiving time differential signals from among combinations of correction values at which receiving errors do not occur, the occurrence of receiving errors may be suppressed even in a case in which a noise invading section exists.

In a sixth aspect of the present disclosure, in the fifth aspect, the transmitting/receiving skew correcting section sets, as the correction value of the transmitting time differential signals and the correction value of the receiving time differential signals, intermediate values of upper limits and lower limits in the combinations of correction values at which the receiving errors by the receiving section do not occur.

In the communication device for a vehicle relating to the sixth aspect, the occurrence of receiving errors may be suppressed even in a case in which a signal difference arises due to the effects of noise at a noise invading section.

A seventh aspect of the present disclosure is a skew correcting method including: measuring a transmitting side signal difference of differential signals to a first control section from a noise invading section that is on a transmission path on which the differential signals are transmitted from the first control section to a second control section; measuring a receiving side signal difference of the differential signals from the noise invading section to the second control section; and, based on results of measurement of the transmitting side signal difference, correcting transmitting time differential signals that are transmitted from the first control section such that the transmitting side signal difference disappears, and, based on results of measurement of the receiving side signal difference, correcting receiving time differential signals that are received at the second control section such that the receiving side signal difference disappears.

In the skew correcting method relating to the seventh aspect, a transmitting side signal difference of differential signals from a noise invading section that is on a transmission path to a first control section, and a receiving side signal difference of differential signals from the noise invading section to the second control section, are measured. Then, on the basis of the results of measurement of the transmitting side signal difference, transmitting time differential signals that are transmitted from the first control section are corrected such that the transmitting side signal difference disappears. Due thereto, the signal difference from the first control section to the noise invading section can be eliminated or can be made to near zero. Further, on the basis of the results of measurement of the receiving side signal difference, receiving time differential signals that are received at the second control section are corrected such that the receiving side signal difference disappears. Due thereto, the signal difference from the noise invading section to the second control section can be eliminated or can be made to near zero. In this way, even in a case in which a noise invading section exists between the first control section and the second control section, the signal difference at this noise invading section can be eliminated or can be made to near zero.

Further, by eliminating the signal difference from the first control section to the noise invading section and the signal difference from the second control section to the noise invading section, the signal difference of the entire transmission path from the first control section to the second control section can be eliminated or can be made to near zero, and the occurrence of receiving errors can be suppressed.

As described above, in accordance with the communication device for a vehicle and the skew correcting method of the present disclosure, differential skew that arises at a noise invading section that is between a transmitting section and a receiving section may be suppressed.

BRIEF DESCRIPTION OF THE DRAWINGS

Exemplary embodiments of the present disclosure will be described in detail based on the following figures, wherein:

FIG. 4 is a model diagram that illustrates an example of a transmission path from a first ECU to a second ECU, and illustrates a state in which differential signals are corrected only at the first ECU;

DETAILED DESCRIPTION

First Exemplary Embodiment

A communication device 10 for a vehicle relating to a first exemplary embodiment is described with reference to the drawings.

(Hardware Structures of Communication Device 10 for Vehicle)

Figure 1:
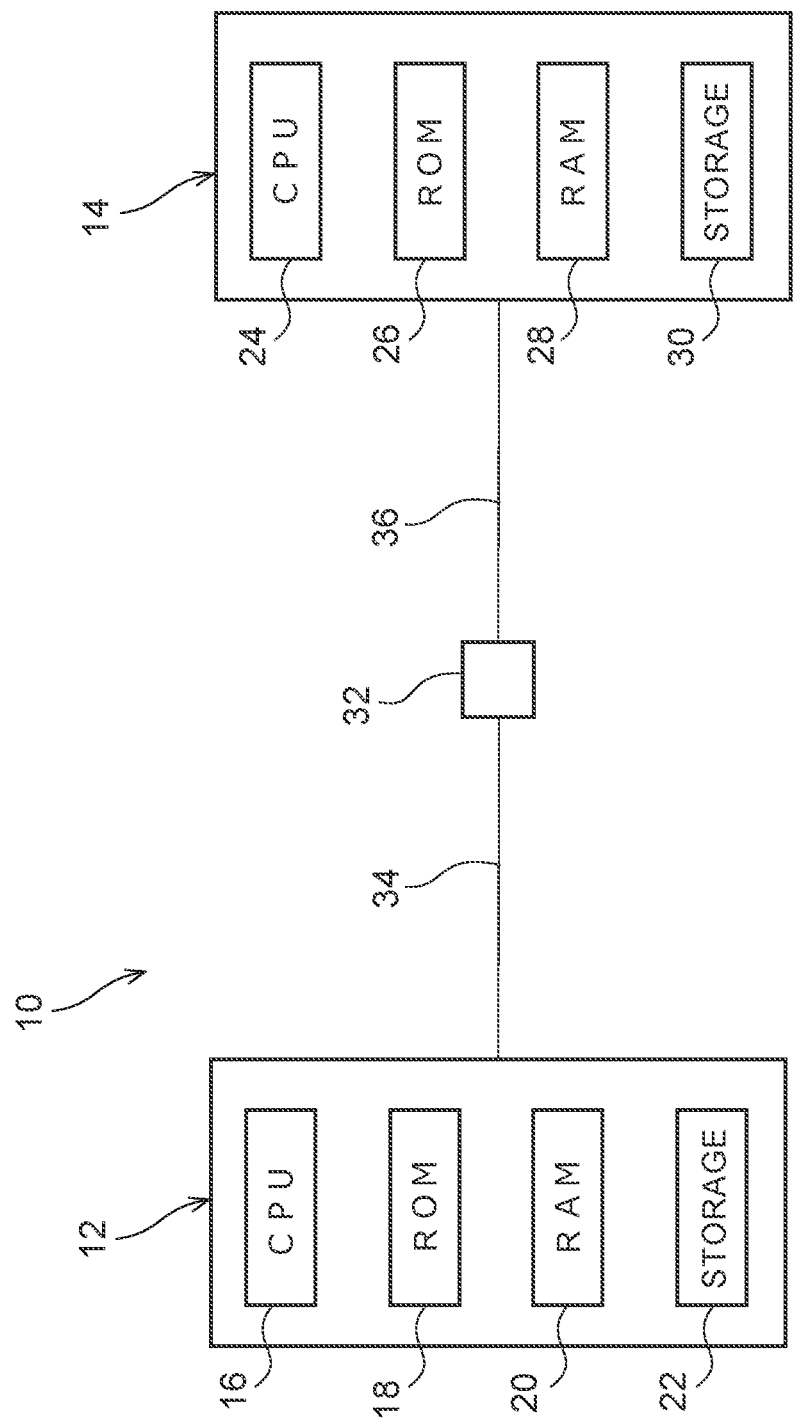
FIG. 1 is a block drawing illustrating hardware structures of a communication device for a vehicle relating to a first exemplary embodiment.

As illustrated in FIG. 1, the communication device 10 for a vehicle of the present exemplary embodiment is structured to include a first ECU (Electronic Control Unit) 12 that serves as a first control section, and a second ECU 14 that serves as a second control section.

The first ECU 12 is structured to include a CPU (Central Processing Unit: processor) 16, a ROM (Read Only Memory) 18, a RAM (Random Access Memory) 20 and a storage 22. These respective structures are connected so as to be able to communicate with one another via an unillustrated bus. The first ECU 12 of the present exemplary embodiment is, as an example, disposed within the instrument panel.

The CPU 16 is a central computing processing unit, and executes various programs and controls respective sections. Namely, the CPU 16 reads-out a program from the ROM 18 or the storage 22, and executes the program by using the RAM 20 as a workspace. Further, the CPU 16 carries out control of the above-described respective structures and carries out various computational processings in accordance with programs that are recorded in the ROM 18 or the storage 22.

The ROM 18 stores various programs and various data. The RAM 20 temporarily stores programs or data as a workspace. The storage 22 is a non-volatile recording medium that is structured by an HDD (Hard Disk Drive) or an SSD (Solid State Drive) and that stores various programs, including the operating system, and various data. In the present exemplary embodiment, a skew correcting program for carrying out skew correction, and the like, are stored in the ROM 18 or the storage 22.

The second ECU 14 is structured to include a CPU 24, a ROM 26, a RAM 28 and a storage 30. These respective structures are connected so as to be able to communicate with one another via an unillustrated bus. The second ECU 14 of the present exemplary embodiment is, as an example, disposed in a vicinity of the floor within the vehicle cabin.

The CPU 24 is a central computing processing unit, and executes various programs and controls respective sections. Namely, the CPU 24 reads-out a program from the ROM 26 or the storage 30, and executes the program by using the RAM 28 as a workspace. Further, the CPU 24 carries out control of the above-described respective structures and carries out various computational processings in accordance with programs that are recorded in the ROM 26 or the storage 30.

The ROM 26 stores various programs and various data. The RAM 28 temporarily stores programs or data as a workspace. The storage 30 is a non-volatile recording medium that is structured by an HDD or an SSD and that stores various programs, including the operating system, and various data. In the present exemplary embodiment, a skew correcting program for carrying out skew correction, and the like, are stored in the ROM 26 or the storage 30.

Here, one end portion of a transmitting side wire harness 34 that structures the transmission path of differential signals is connected to the first ECU 12. The another end portion of the transmitting side wire harness 34 is connected to a relay connector 32.

On the other hand, one end portion of a receiving side wire harness 36 that structures the transmission path of differential signals is connected to the second ECU 14. The another end portion of the receiving side wire harness 36 is connected to the relay connector 32. Therefore, the first ECU 12 and the second ECU 14 are connected to one another via the transmitting side wire harness 34, the relay connector 32 and the receiving side wire harness 36.

Here, the communication device 10 for a vehicle of the present exemplary embodiment carries out communication by transmitting signals from the first ECU 12 to the second ECU 14. Further, the first ECU 12 carries out data transmission of data by using differential signals as an EMC countermeasure. In communication using differential signals, two signal lines that are a positive side signal line and a negative side signal line are used, and currents of phases that are opposite one another flow through these two signal lines, and transfer of a signal is carried out by the potential difference between the signal lines.

Communication using differential signals is resistant to noise, but on the other hand, there are cases in which a time difference, i.e., differential skew, arises between the differential signals on the two signal lines. In particular, at the transmitting side wire harness 34, it is easy for differential skew to arise at the end that is connected to the relay connector 32 and the end that is connected to the first ECU 12. At the receiving side wire harness 36, it is easy for differential skew to arise at the end that is connected to the relay connector 32 and the end that is connected to the second ECU 14. The communication device 10 for a vehicle of the present exemplary embodiment has a function that suppresses these differential skews.

(Functional Structures of Communication Device 10 for Vehicle)

The communication device 10 for a vehicle realizes various functions by using the above-described hardware resources. The functional structures that are realized by the communication device 10 for a vehicle are described with reference to FIG. 2.

Figure 2:
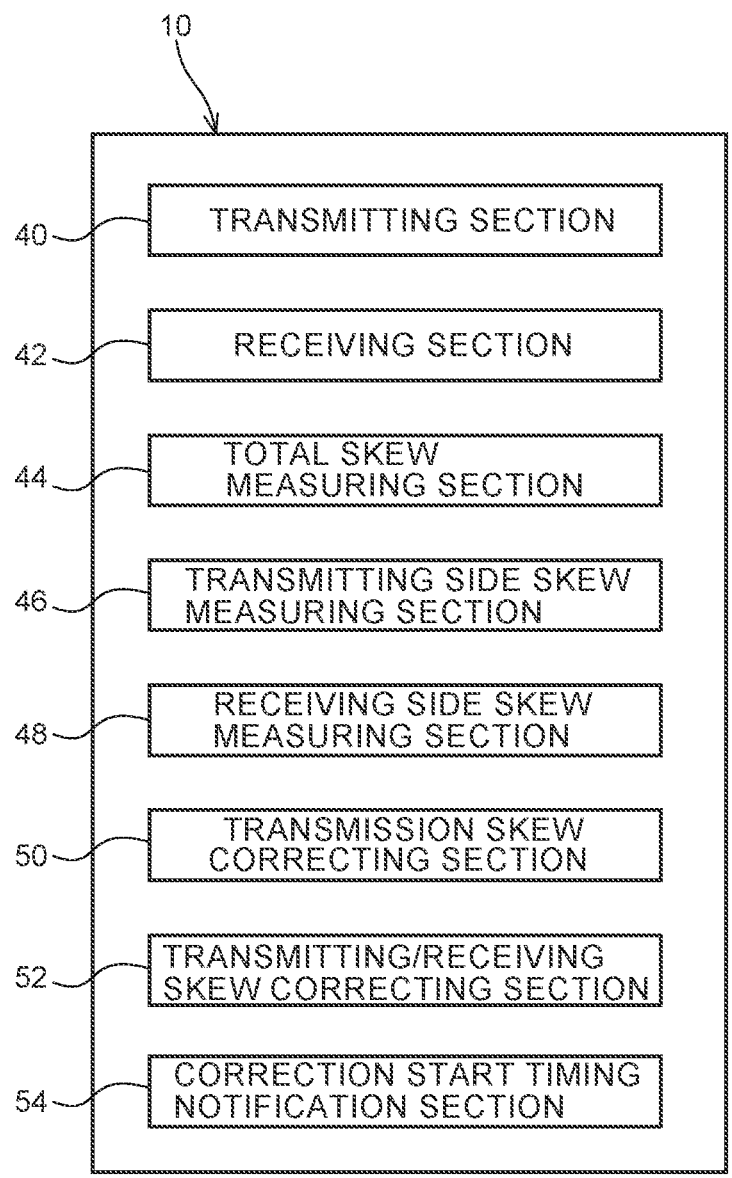
FIG. 2 is a block drawing illustrating functional structures of the communication device for a vehicle relating to the first exemplary embodiment.

As illustrated in FIG. 2, the communication device 10 for a vehicle is structured to include, as the functional structures thereof, a transmitting section 40, a receiving section 42, a total skew measuring section 44, a transmitting side skew measuring section 46, a receiving side skew measuring section 48, a transmission skew correcting section 50, a transmitting/receiving skew correcting section 52, and a correction start timing notification section 54. These respective functional structures are realized by at least one of the CPU 16 of the first ECU 12 and the CPU 24 of the second ECU 14 reading-out and executing a program.

The transmitting section 40 transmits differential signals from the first ECU 12 to the second ECU 14 via the transmitting side wire harness 34 and the receiving side wire harness 36. For example, the transmitting section 40 transmits differential signals through an unillustrated input/output interface of the first ECU 12.

The receiving section 42 receives the differential signals that are transmitted from the first ECU 12 to the second ECU 14 by the transmitting section 40. For example, the receiving section 42 receives the differential signals through an unillustrated input/output interface of the second ECU 14.

The total skew measuring section 44 measures the signal difference of the differential signals on the transmission path of the differential signals. Concretely, the total skew measuring section 44 measures the signal difference of the differential signals from the first ECU 12 to the second ECU 14. For example, a method using a NOR latch circuit is a method of measuring the signal difference. Further, the signal difference may be measured by using another method such as TDR (Time Domain Reflectometry) or the like.

The transmitting side skew measuring section 46 measures the signal difference of the differential signals between the first ECU 12 and the relay connector 32. The receiving side skew measuring section 48 measures the signal difference of the differential signals between the relay connector 32 and the second ECU 14.

Figure 3B:
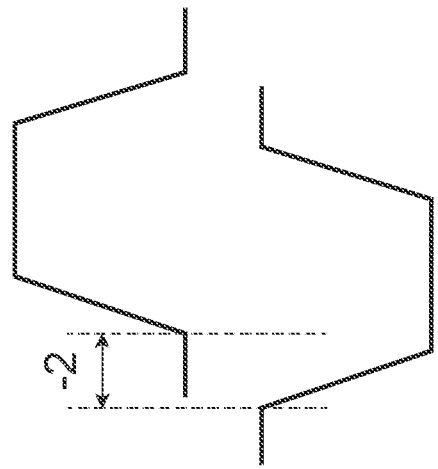
FIG. 3B is a schematic model diagram that schematically illustrates differential signals and illustrates a state in which differential skew of a receiving side has arisen.
Figure 3A:
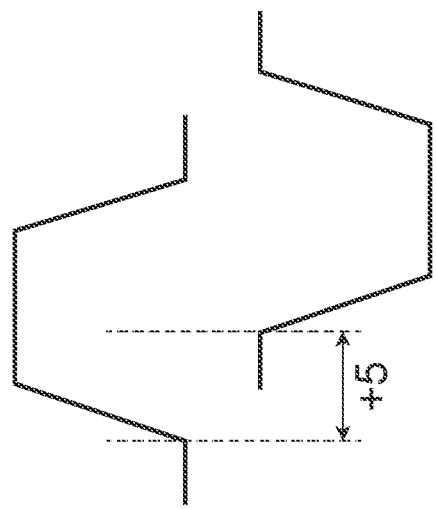
FIG. 3A is a schematic model diagram that schematically illustrates differential signals and illustrates a state in which differential skew of a transmitting side has arisen.

Here, FIG. 3A illustrates differential signals in a state in which a signal difference of +5 has arisen between the first ECU 12 and the relay connector 32. Namely, this is a state in which the signal line at the negative side is ahead of the signal line at the positive side by a time that is five times a predetermined unit time. Further, FIG. 3B illustrates differential signals in a state in which a signal difference of −2 has arisen between the relay connector 32 and the second ECU 14. Namely, this is a state in which the signal line at the negative side is later than the signal line at the positive side by a time that is twice the predetermined unit time. Examples of reasons why a signal difference arises are differences in the manufacturers and the types of the transmitting side wire harness 34 and the receiving side wire harness 36, and differences in the connecting ends and the peripheral environments, and the like. For example, a signal difference may arise because the second ECU 14 is disposed in a vicinity of the floor of the vehicle cabin interior which is close to room temperature, as compared with the first ECU 12 being disposed in the relatively high-temperature environment at the interior of the instrument panel.

As illustrated in FIG. 4, because a signal difference of +5 has arisen between the first ECU 12 and the relay connector 32, and a signal difference of −2 has arisen between the relay connector 32 and the second ECU 14, there is a state in which a signal difference of +3 has arisen on the transmission path overall.

In the above-described state, the total skew measuring section 44 illustrated in FIG. 2 measures that a signal difference of +3 has arisen on the transmission path overall. Further, the transmitting side skew measuring section 46 measures that a signal difference of +5 has arisen between the first ECU 12 and the relay connector 32. Moreover, the receiving side skew measuring section 48 measures that a signal difference of −2 has arisen between the relay connector 32 and the second ECU 14.

The transmission skew correcting section 50 corrects only the transmitting time differential signals so as to eliminate the signal difference at the entire transmission path. In the example illustrated in FIG. 4, because there is a state in which a signal difference of +3 has arisen at the entire transmission path, due to the transmission skew correcting section 50 correcting the transmitting time differential signals, the timing of the signal line at the positive side is shifted by −3 with respect to the signal line at the negative side. Namely, the transmission skew correcting section 50 corrects the transmitting time differential signals by a correction value of −3. Note that, as methods of correcting the transmitting time differential signals, there are, for example, a method of introducing a delay into the bus by using a multiplexer, a method of utilizing a delay line that uses current control, and the like. The same methods are examples of methods of correcting the receiving time differential signals that are described later.

On the other hand, the transmitting/receiving skew correcting section 52 that is illustrated in FIG. 2 corrects both the transmitting time differential signals that are transmitted from the first ECU 12 and the receiving time differential signals that are received by the second ECU 14, on the basis of the signal differences that are measured by the transmitting side skew measuring section 46 and the receiving side skew measuring section 48.

Figure 5:
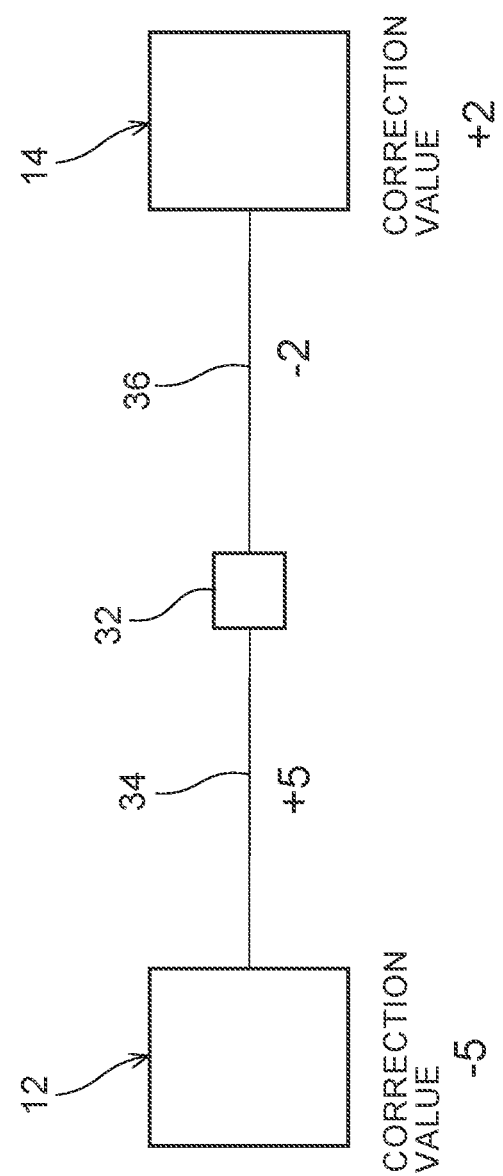
FIG. 5 is a model diagram that illustrates an example of a transmission path from the first ECU to the second ECU, and illustrates a state in which differential signals are corrected at both the first ECU and the second ECU.

Concretely, the transmitting/receiving skew correcting section 52 corrects the transmitting time differential signals and the receiving time differential signals such that the signal difference between the first ECU 12 and the relay connector 32 provided on the transmission path, and the signal difference between the relay connector 32 and the second ECU 14, disappear. FIG. 5 illustrates a state in which the signal difference between the first ECU 12 and the relay connector 32 is measured as +5 by the transmitting side skew measuring section 46. Further, FIG. 5 illustrates a state in which the signal difference between the relay connector 32 and the second ECU 14 is measured as −2 by the receiving side skew measuring section 48. On the basis of these signal differences, the transmitting/receiving skew correcting section 52 corrects the transmitting time differential signals by a correction value of −5. Further, the transmitting/receiving skew correcting section 52 corrects the receiving time differential signals by a correction value of +2.

Here, as an example, the transmitting/receiving skew correcting section 52 of the present exemplary embodiment corrects the transmitting time differential signals and the receiving time differential signals in a case in which, in a state in which the transmitting time differential signals have been corrected by the transmission skew correcting section 50, a receiving error by the receiving section 42 occurs a predetermined number of times or more. Therefore, correction by the transmitting/receiving skew correcting section 52 is not executed in states in which errors do not occur at times when the receiving section 42 receives the differential signals.

As illustrated in FIG. 2, the correction start timing notification section 54 notifies the first ECU 12 or the second ECU 14 of the timing of the start of correction. Concretely, the correction start timing notification section 54 notifies the second ECU 14 of the timing of the start of correction of the transmitting time differential signals by the transmitting/receiving skew correcting section 52, or notifies the first ECU 12 of the timing of the start of correction of the receiving time differential signals by the transmitting/receiving skew correcting section 52. For example, if the correction start timing notification section 54 notifies the second ECU 14 of the timing of the start of correction of the transmitting time differential signals, correction of the receiving time differential signals can be started in accordance with the start of the correction of the transmitting time differential signals. Further, if the correction start timing notification section 54 notifies the first ECU 12 of the timing of the start of correction of the receiving time differential signals, correction of the transmitting time differential signals can be started in accordance with the start of the correction of the receiving time differential signals. Note that examples of the information that the correction start timing notification section 54 gives notice of are the contents that correction will start after a predetermined time period elapses, or the contents that correction will start after transmission is carried out a predetermined number of times, or the like.

(Operation)

Operation of the present exemplary embodiment is described next.

(Example of Skew Correcting Processing)

Figure 6:
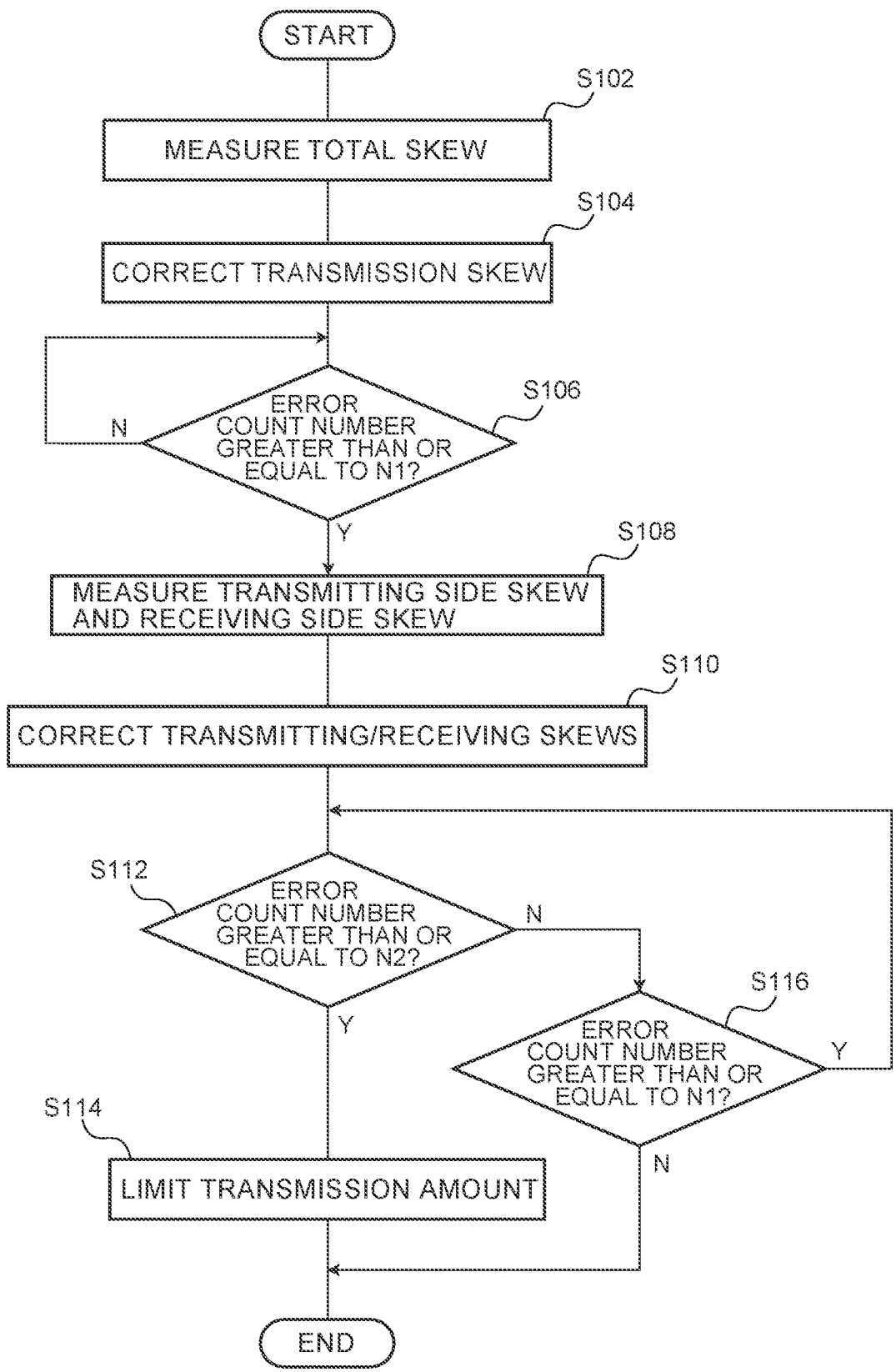
FIG. 6 is a flowchart illustrating an example of the flow of skew correcting processing in the first exemplary embodiment.

FIG. 6 is a flowchart illustrating an example of the flow of the skew correcting processing by the communication device 10 for a vehicle. This skew correcting processing is executed by the CPU 16 of the first ECU 12 reading-out a program from the ROM 18 or the storage 22, and expanding the program in the RAM 20 and executing the program. Further, the skew correcting processing may be executed by the CPU 24 of the second ECU 14 reading-out a program from the ROM 26 or the storage 30, and expanding the program in the RAM 28 and executing the program. Moreover, the skew correcting processing may be executed by both the CPU 16 of the first ECU 12 and the CPU 24 of the second ECU 14.

As illustrated in FIG. 6, in step S102, the CPU 16 measures the total skew of the transmission path from the first ECU 12 to the second ECU 14. Concretely, by the function of the total skew measuring section 44, the CPU 16 measures the signal difference of the differential signals from the first ECU 12 to the second ECU 14. In the example illustrated in FIG. 4, the signal difference of the differential signals from the first ECU 12 to the second ECU 14 is measured as +3.

In step S104, the CPU 16 carries out correction of the transmission skew. Concretely, by the function of the transmission skew correcting section 50, the CPU 16 corrects the transmitting time differential signals such that the signal difference at the entire transmission path disappears. In the example illustrated in FIG. 4, the transmission skew correcting section 50 corrects the transmitting time differential signals by a correction value of −3.

Due to a correction value of −3 being set for the transmitting time differential signals, the signal difference of the differential signals received by the second ECU 14 disappears. On the other hand, at the relay connector 32, there is a state in which a signal difference of +2 has arisen.

In step S106, the CPU 16 determines whether or not an error count number is greater than or equal to N1. Concretely, on the basis of signals from the receiving section 42, the CPU 16 counts the number of times that the differential signals, which were transmitted from the first ECU 12 to the second ECU 14, could not be received normally. Then, if the error number that is counted is greater than or equal to N1 which is set in advance, the CPU 16 moves on to the processing of step S108. On the other hand, if the error count number is less than N1, the CPU 16 repeats the processing of step S106 and measures the error count number. Namely, the processings from step S108 and thereon are not carried out, and communication is carried out while continuing in a state in which the transmitting time differential signals are corrected by the correction value that was set in step S104.

Here, in step S106, the count number is made to differ in a case in which the receiving error is 1 bit and in a case in which the receiving error is plural bits. For example, in a case of a receiving error of 1 bit, the error number is counted as 1. In contrast, in a case in which a receiving error of plural bits occurs, the error count number may be made to be a number that is greater than 1, e.g., the error count number may be made to be 5.

Further, in step S106, if there is no receiving error and the signals can be received normally at the receiving section 42, the error count number is reduced. Therefore, in the present exemplary embodiment, the error count is increased in a case in which the number of times that there is a receiving error is greater than the number of times that signals can be received normally, and in a case in which a receiving error of plural bits occurs. Note that there may be a structure in which the error count number is decreased only in cases in which signals can continuously be received normally.

In step S108, the CPU 16 measures the transmitting side skew and the receiving side skew. Concretely, by the function of the transmitting side skew measuring section 46, the CPU 16 measures the transmitting side signal difference that is the signal difference of the differential signals from the first ECU 12 to the relay connector 32. Further, by the function of the receiving side skew measuring section 48, the CPU 16 measures the receiving side signal difference that is the signal difference of the differential signals from the relay connector 32 to the second ECU 14. In the example illustrated in FIG. 5, the transmitting side signal difference between the first ECU 12 and the relay connector 32 is measured as +5, and the receiving side signal difference between the relay connector 32 and the second ECU 14 is measured as −2.

As illustrated in FIG. 6, in step S110, the CPU 16 corrects the transmitting/receiving skews. Concretely, by the function of the transmitting/receiving skew correcting section 52, the CPU 16 corrects both the transmitting time differential signals that are transmitted from the first ECU 12 and the receiving time differential signals that are received at the second ECU 14. In the example illustrated in FIG. 5, the transmitting/receiving skew correcting section 52 sets the correction value of the transmitting time differential signals as −5 on the basis of the results of measuring the transmitting side signal difference, and sets the correction value of the receiving time differential signals as +2 on the basis of the results of measuring the receiving side signal difference.

Here, in the present exemplary embodiment, at the time when the transmitting/receiving skews are corrected in step S110, the CPU 16 notifies the second ECU 14 of the timing of the start of correction, by the function of the correction start timing notification section 54.

Due to a correction value of −5 being set for the transmitting time differential signals, the signal difference from the first ECU 12 to the relay connector 32 disappears. Further, due to a correction value of +2 being set for the receiving time differential signals, the signal difference from the relay connector 32 to the second ECU 14 disappears. Due thereto, the signal difference of the differential signals received by the second ECU 14 disappears.

As illustrated in FIG. 6, in step S112, the CPU 16 determines whether or not the error count number is greater than or equal to N2. Concretely, on the basis of signals from the receiving section 42, the CPU 16 counts the number of times that the differential signals that were transmitted from the first ECU 12 to the second ECU 14 could not be received normally. If the error number that is counted is greater than or equal to N2 that has been set in advance, the CPU 16 moves on to the processing of step S114.

In step S114, the CPU 16 limits the transmission amount. Concretely, the CPU 16 instructs the first ECU 12 to limit the transmission amount of the differential signals. What is called limiting of the transmission amount here includes lowering the transmission speed, enlarging the transmission period, changing the modulation method, and the like.

On the other hand, if the error count number is less than N2 in step S112, the CPU 16 moves on to the processing of step S116.

In step S116, the CPU 16 determines whether or not the error count number is greater than or equal to N1. If the error count number is greater than or equal to N1, the CPU 16 moves on to the processing of step S112, and continues counting the error count number. Therefore, in a case in which the error count number is greater than or equal to N1 but less than N2, communication is carried out by using the correction value of the transmitting time differential signals and the correction value of the receiving time differential signals that were set in the processing of step S110.

On the other hand, if the error count number is less than N1 in step S116, the CPU 16 ends the skew correcting processing. Note that the skew correcting processing is carried out each predetermined time period until the power of the vehicle is turned off.

As described above, in the communication device 10 for a vehicle relating to the present exemplary embodiment, by correcting the differential signals at both the first ECU 12 and the second ECU 14, the signal difference can be eliminated or can made to near zero even in a case in which the relay connector 32 or the like that is a noise invading section exists between the first ECU 12 and the second ECU 14.

By eliminating the signal difference from the first ECU 12 to the relay connector 32 and the signal difference from the second ECU 14 to the relay connector 32, the signal difference of the entire transmission path from the first ECU 12 to the second ECU 14 can be eliminated or can be made to near zero. As a result, the differential skew that arises at a noise invading section such as the relay connector 32 or the like can be suppressed, and the occurrence of receiving errors can be suppressed.

In particular, in the present exemplary embodiment, during the time period until the number of receiving errors reaches N1, only the transmitting time differential signals that are transmitted from the first ECU 12 are corrected. Due thereto, unnecessary correction of both the differential signals at the time of transmitting and the differential signals at the time of receiving in a state in which the receiving of the differential signals is being carried out relatively well, can be suppressed. Namely, in a case in which both the differential signals at the time of transmitting and the differential signals at the time of receiving are corrected, the load is greater than in a case in which correction is carried out at only one side. Therefore, during the time period until the number of receiving errors reaches N1, a smaller load that is needed for correction suffices, and therefore, resources can be allocated to other processings.

On the other hand, in a case in which receiving errors have arisen N1 times or more, by correcting both the transmitting time differential signals and the receiving time differential signals by the transmitting/receiving skew correcting section 52, receiving errors can be suppressed effectively.

Further, in the present exemplary embodiment, due to the correction start timing notification section 54 notifying the second ECU 14 of the timing of the start of correction of the transmitting time differential signals, the timing of the start of correction of the transmitting time differential signals and the timing of the start of correction of the receiving time differential signals can be made to accord.

Moreover, in the present exemplary embodiment, in a case in which the counted error number is greater than or equal to N2 that is set in advance, by limiting the transmission amount of the differential signals, important data becoming a receiving error and becoming unable to be received can be suppressed.

Second Exemplary Embodiment

A communication device 70 for a vehicle relating to a second exemplary embodiment is described next with reference to the drawings. Note that structures that are similar to those of the first exemplary embodiment are denoted by the same reference numerals, and description thereof is omitted appropriately. Further, the hardware structures of the communication device 70 for a vehicle of the present exemplary embodiment are as illustrated in FIG. 1, in the same way as in the first exemplary embodiment.

(Functional Structures of Communication Device 70 for Vehicle)

The communication device 70 for a vehicle realizes various functions by using the hardware resources illustrated in FIG. 1. The functional structures that are realized by the communication device 70 for a vehicle are described with reference to FIG. 7.

Figure 7:
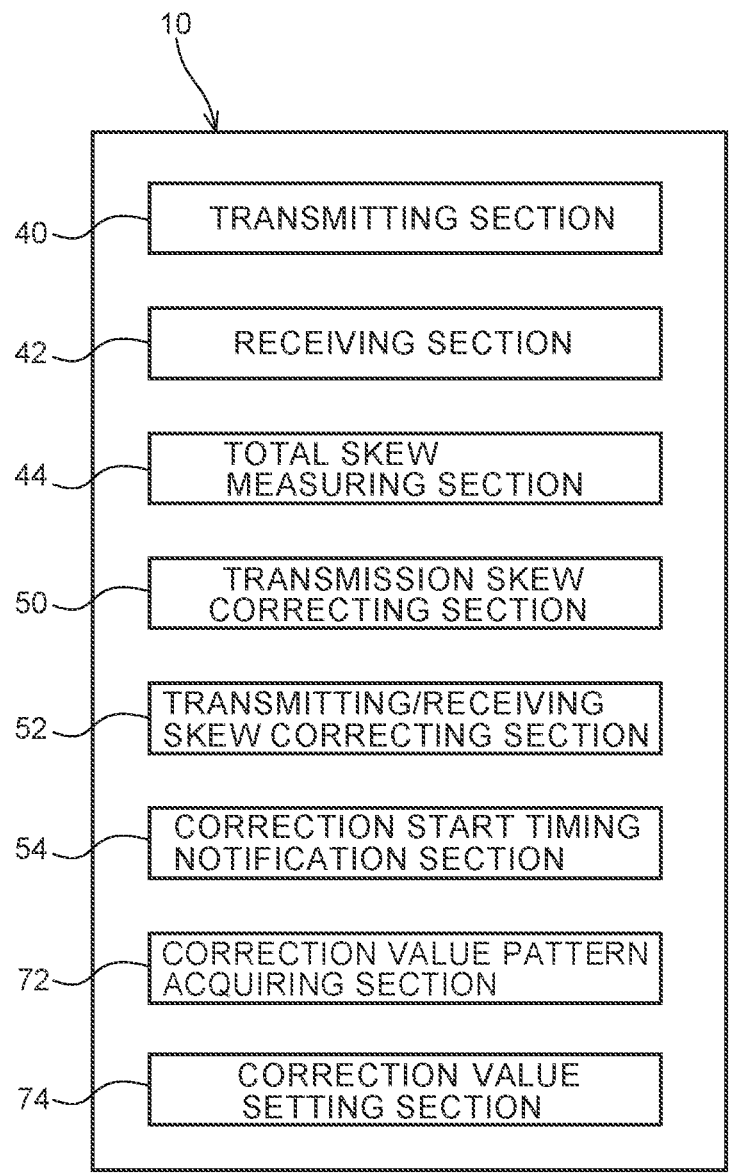
FIG. 7 is a block drawing illustrating functional structures of a communication device for a vehicle relating to a second exemplary embodiment.

As illustrated in FIG. 7, the communication device 70 for a vehicle is structured to include, as the functional structures thereof, the transmitting section 40, the receiving section 42, the total skew measuring section 44, the transmission skew correcting section 50, the transmitting/receiving skew correcting section 52, the correction start timing notification section 54, a correction value pattern acquiring section 72, and a correction value setting section 74. Namely, as compared with the first exemplary embodiment, the communication device 70 for a vehicle of the present exemplary embodiment does not have the functions of the transmitting side skew measuring section 46 and the receiving side skew measuring section 48. Further, the communication device 70 for a vehicle of the present exemplary embodiment has the functions of the correction value pattern acquiring section 72 and the correction value setting section 74. These respective functional structures are realized by at least one of the CPU 16 and the CPU 24 reading-out and executing a program.

The correction value pattern acquiring section 72 acquires a combination of a correction value of the transmitting time differential signals and a correction value of the receiving time differential signals at which the signal difference that is measured at the total skew measuring section 44 disappears. As an example, a case is assumed in which the signal difference of the differential signals from the first ECU 12 to the second ECU 14, which is measured by the total skew measuring section 44, is +10. In this case, given that the correction value of the transmitting time differential signals is X and the correction value of the receiving time differential signals is Y, combinations [X,Y] of correction values that are acquired by the correction value pattern acquiring section 72 are as follows. [X,Y]=[−10,+20], [−9,+19], [−8,+18], [−7,+17], □, [+19,−9], [+20,−10].

The correction value setting section 74 sets the correction value of the transmitting time differential signals and the correction value of the receiving time differential signals from among combinations of correction values at which receiving errors by the receiving section 42 do not arise. Concretely, combinations of correction values acquired by the correction value pattern acquiring section 72 are set in order, and communication is carried out. Then, correction of the transmitting time differential signals and the receiving time differential signals is carried out by using a combination of correction values at which a receiving error does not occur at the receiving section 42.

Here, the correction value setting section 74 of the present exemplary embodiment sets, as the correction value of the transmitting time differential signals and the correction value of the receiving time differential signals, intermediate values of the upper limits and the lower limits in the combinations of correction values at which receiving errors do not occur. For example, in a case in which receiving errors do not occur with combinations of [X,Y]=[−5,+15], [−4,+14], [−3,+13], □, [+6,+4], [+7,+3], as intermediate values of the upper limits and the lower limits, [X,Y]=[+1,+9] are set as the correction values.

(Operation)

Operation of the present exemplary embodiment is described next.

(Example of Skew Correcting Processing)

Figure 8:
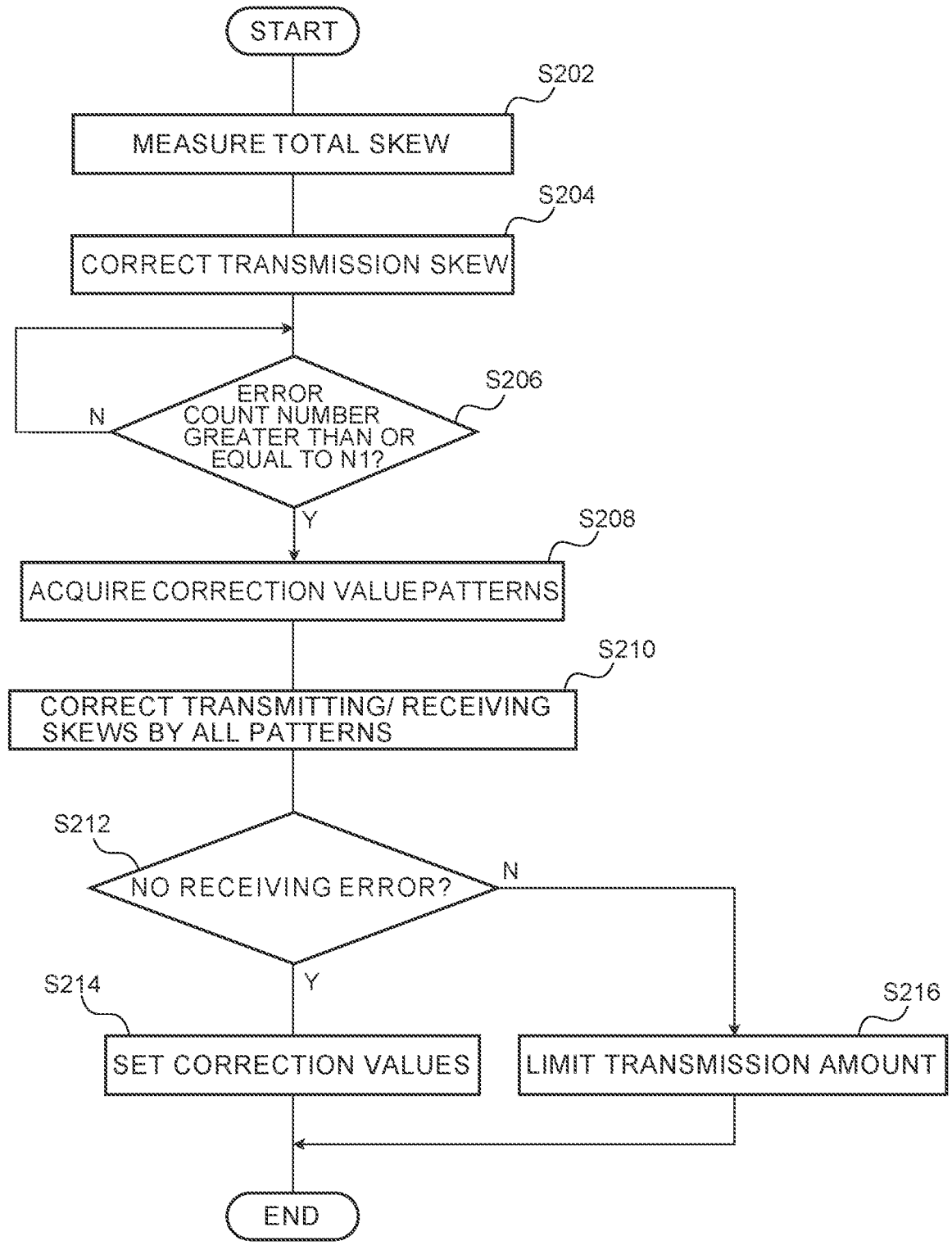
FIG. 8 is a portion of a flowchart illustrating an example of the flow of skew correcting processing in the second exemplary embodiment.

FIG. 8 is a flowchart illustrating an example of the flow of the skew correcting processing by the communication device 70 for a vehicle. This skew correcting processing is executed by the CPU 24 of the second ECU 14 reading-out a program from the ROM 26 or the storage 30, and expanding the program in the RAM 28 and executing the program.

As illustrated in FIG. 8, the processings from step S202 to step S206 are similar to the processings from step S102 to step S106 of the first exemplary embodiment. Namely, in step S202, the CPU 24 measures the total skew by the function of the total skew measuring section 44. Then, in step S204, the CPU 24 corrects the transmitting time differential signals by the function of the transmission skew correcting section 50.

In step S206, the CPU 24 determines whether or not the error count number is greater than or equal to N1. If the error number that has been counted is greater than or equal to N1 which is set in advance, the CPU 24 moves on to the processing of step S208. On the other hand, if the error count number is less than N1, the CPU 16 repeats the processing of step S206 and measures the error count number.

In step S208, the CPU 24 acquires patterns of correction values. Concretely, by the function of the correction value pattern acquiring section 72, the CPU 24 acquires combinations of the correction value of the transmitting time differential signals and the correction value of the receiving time differential signals.

Next, in step S210, the CPU 24 carries out correction of the transmitting time differential signals and the receiving time differential signals by all of the correction value patterns. For example, in a case in which combinations of 31 patterns that are [X,Y]=[−10,+20], [−9,+19], [−8,+18], [−7,+17], □, [+19,−9], [+20,−10] are acquired, correction of the transmitting time differential signals and the receiving time differential signals is carried out with each combination. Namely, communication is carried out while setting −10 as the correction value of the transmitting time differential signals and setting +20 as the correction value of the receiving time differential signals. Next, communication is carried out while setting −9 as the correction value of the transmitting time differential signals and +19 as the correction value of the receiving time differential signals. Communication is carried out while setting the correction values of the transmitting time differential signals and the receiving time differential signals by using the 31 combinations in this way. At this time, the timing of the correction of the transmitting time differential signals and the timing of the correction of the receiving time differential signals are made to accord by the function of the correction start timing notification section 54.

In step S212, the CPU 24 determines whether or not there exists a pattern of correction values at which there is no receiving error. Then, if a pattern of correction values at which there is no receiving error does exist in step S212, the CPU 24 moves on to the processing of step S214. On the other hand, if receiving errors occur with all of the correction value patterns in step S212, the CPU 24 moves on to the processing of step S216.

In step S216, the CPU 24 limits the transmission amount. Concretely, the CPU 16 instructs the first ECU 12 to limit the transmission amount of the differential signals.

On the other hand, the CPU 24 sets the correction values in step S214. Concretely, by the function of the correction value setting section 74, the CPU 24 sets intermediate values of the upper limits and the lower limits in the combinations of correction values at which receiving errors do not occur, as the correction value of the transmitting time differential signals and the correction value of the receiving time differential signals. For example, in a case in which receiving errors do not occur with combinations of [X,Y]=[−5,+15], [−4,+14], [−3,+13], □, [+6,+4], [+7,+3], as intermediate values of the upper limits and the lower limits, [X,Y]=[+1,+9] are set as the correction values. Then, the skew correcting processing ends.

As described above, in the communication device 70 for a vehicle relating to the present exemplary embodiment, by setting the correction value of the transmitting time differential signals and the correction value of the receiving time differential signals from among combinations of correction values at which receiving errors do not occur, the occurrence of receiving errors can be suppressed even in a case in which the relay connector 32 exists.

In particular, by setting, as the correction values, intermediate values of the upper limits and the lower limits of combinations at which receiving errors do not occur as in the present exemplary embodiment, the occurrence of receiving errors can be suppressed even in a case in which a slight signal difference arises due to the effects of noise.

Further, in the communication device 70 for a vehicle relating to the present exemplary embodiment, the occurrence of receiving errors can be suppressed even in a case in which the first ECU 12 does not have a skew measuring function, as in the case of electronic equipment from which compactness is required such as a camera or the like.

Although the communication device 10 for a vehicle relating to the first exemplary embodiment and the communication device 70 for a vehicle relating to the second exemplary embodiment have been described above, the present disclosure can of course be implemented in various forms within a scope that does not depart from the gist thereof. For example, in the above-described embodiments, first, only the transmitting time differential signals are corrected, and, in a case in which the error count number becomes greater than or equal to N1, both the transmitting time differential signals and the receiving time differential signals are corrected. However, the present disclosure is not limited to this. Namely, in the flowchart of FIG. 6, processing may start from step S108.

Further, in the above-described embodiments, notice of the correction timing is given by the function of the correction start timing notification section 54, but the present disclosure is not limited to this. For example, the first ECU 12 and the second ECU 14 may implement correction at arbitrary timings, respectively. In this case as well, the signal difference can be eliminated or can be made to near zero at the timings at which both the transmitting time differential signals and the receiving time differential signals are corrected.

Moreover, in the above-described embodiments, the respective functional structures that are illustrated in FIG. 2 and FIG. 7 are realized by at least one of the CPU 16 and the CPU 24 reading-out and executing a program, but the present disclosure is not limited to this. For example, some of the functional structures may be executed by a control section that is other than the first ECU 12 and the second ECU 14. For example, the respective functional structures may be realized by a control section, which is provided at the exterior of the vehicle, sending signals to the first ECU 12 and the second ECU 14 via a network.

Still further, in the above-described second exemplary embodiment, the correction value setting section 74 sets, as the correction value of the transmitting time differential signals and the correction value of the receiving time differential signals, intermediate values of the upper limits and the lower limits in the combinations of correction values at which receiving errors do not occur. However, the present disclosure is not limited to this. For example, one combination of correction values at which a receiving error does not occur may be set as the correction value of the transmitting time differential signals and the correction value of the receiving time differential signals. In this case, if a receiving error occurs at the set combination of correction values, the combination may be changed to another combination.

Moreover, any of various types of processors other than a CPU may execute the processings that are executed by the CPU 16 and the CPU 24 reading-in software (programs) in the above-described embodiments. Examples of processors in this case include PLDs (Programmable Logic Devices) whose circuit structure can be changed after production such as FPGAs (Field-Programmable Gate Arrays) and the like, or dedicated electrical circuits that are processors having circuit structures that are designed for the sole purpose of executing specific processings such as ASICs (Application Specific Integrated Circuits) and the like, or the like. Further, the skew correcting processing may be executed by one of these various types of processors, or may be executed by combining two or more of the same type or different types of processors (e.g., plural FPGAs, or a combination of a CPU and an FPGA, or the like). Further, the hardware structures of these various types of processors are, more concretely, electrical circuits that combine circuit elements such as semiconductor elements and the like.

Moreover, in the above-described embodiments, the storage 22 and the storage 30 are memories that are non-volatile recording media. However, the present disclosure is not limited to this. For example, a non-transitory recording medium such as a CD (Compact Disk), a DVD (Digital Versatile Disk), a USB (Universal Serial Bus) memory, or the like may be used as the recording section. In this case, various types of programs may be stored on these recording media.

What is claimed is:

1. A communication device for a vehicle, the communication device comprising:
   a first processor and a second processor, wherein
   the first processor is configured to transmit differential signals to the second processor via a transmission path;
   the second processor is configured to receive the transmitted differential signals; and
   at least one of the first processor and the second processor is configured to:
   measure a transmitting side signal difference of the differential signals from the first processor to a noise invading section that is on the transmission path;
   measure a receiving side signal difference of the differential signals from the noise invading section to the second processor; and
   based on the measured transmitting side signal difference and the measured receiving side signal difference, correct both transmitting time differential signals that are transmitted from the first processor and receiving time differential signals that are received at the second processor such that (i) the transmitting side signal difference between the first processor and the noise invading section, and (ii) the reception side signal difference between the second processor and the noise invading section, are eliminated.

2. The communication device for a vehicle of claim 1, wherein the at least one of the first processor and the second processor notifies the second processor of a timing of a start of correction of the transmitting time differential signals, or the at least one of the first processor and the second processor notifies the first processor of a timing of a start of correction of the receiving time differential signals.

3. The communication device for a vehicle of claim 1, wherein the at least one of the first and second processors corrects the transmitting time differential signals and the receiving time differential signals in response to (i) the communication device being in a state in which only the transmitting time differential signals have been corrected such that both the transmitting side signal difference and the receiving side signal difference are eliminated and (ii) receiving errors of the differential signals that are transmitted to the second processor having occurred a predetermined number of times or more.

4. The communication device for a vehicle of claim 1, wherein the noise invading section is a relay connector.

5. A communication device for a vehicle, the communication device comprising
   a first processor and a second processor, wherein
   the first processor is configured to transmit differential signals to the second processor via a transmission path;

the second processor is configured to receive the transmitted differential signals;

at least one of the first processor and the second processor is configured to:

measure a signal difference of the differential signals on the transmission path; and based on the measured signal difference, correct both transmitting time differential signals that are transmitted from the first processor and receiving time differential signals that are received at the second processor; and the at least one of the first and second processors acquires combinations of a correction value of the transmitting time differential signals and a correction value of the receiving time differential signals such that the measured signal difference is eliminated, and carries out correction of the transmitting time differential signals and the receiving time differential signals by using all of the combinations, and sets the correction value of the transmitting time differential signals and the correction value of the receiving time differential signals from one of the combinations at which receiving errors of the differential signals that are transmitted to the second processor do not occur.

6. The communication device for a vehicle of claim 5, wherein the at least one of the first and second processors sets, as the correction value of the transmitting time differential signals and the correction value of the receiving time differential signals, intermediate values of upper limits and lower limits in the combinations of correction values at which the receiving errors do not occur.

7. A skew correcting method comprising, by at least one of a first processor and a second processor:

measuring a transmitting side signal difference of differential signals from the first processor to a noise invading section that is on a transmission path on which the differential signals are transmitted from the first processor to the second processor;

measuring a receiving side signal difference of the differential signals from the noise invading section to the second processor; and based on results of measurement of the transmitting side signal difference, correcting transmitting time differential signals that are transmitted from the first processor such that the transmitting side signal difference is eliminated, and, based on results of measurement of the receiving side signal difference, correcting receiving time differential signals that are received at the second processor such that the receiving side signal difference is eliminated.

8. A non-transitory compute readable medium storing a program thereon causing at least one of a first processor and a second processor to execute a skew correcting method, the method comprising:

measuring a transmitting side signal difference of differential signals from the first processor to a noise invading section that is on a transmission path on which the differential signals are transmitted from the first processor to the second processor;

measuring a receiving side signal difference of the differential signals from the noise invading section to the second processor; and based on results of measurement of the transmitting side signal difference, correcting transmitting time differential signals that are transmitted from the first processor to the noise invading section such that the transmitting side signal difference is eliminated, and, based on results of measurement of the receiving side signal difference, correcting receiving time differential signals that are received at the second processor from the noise invading section such that the receiving side signal difference is eliminated.

* * * * *